May 23, 1933.　　　K. TESSKY　　　1,910,574
MACHINE TOOL
Filed May 9, 1931　　　4 Sheets-Sheet 1
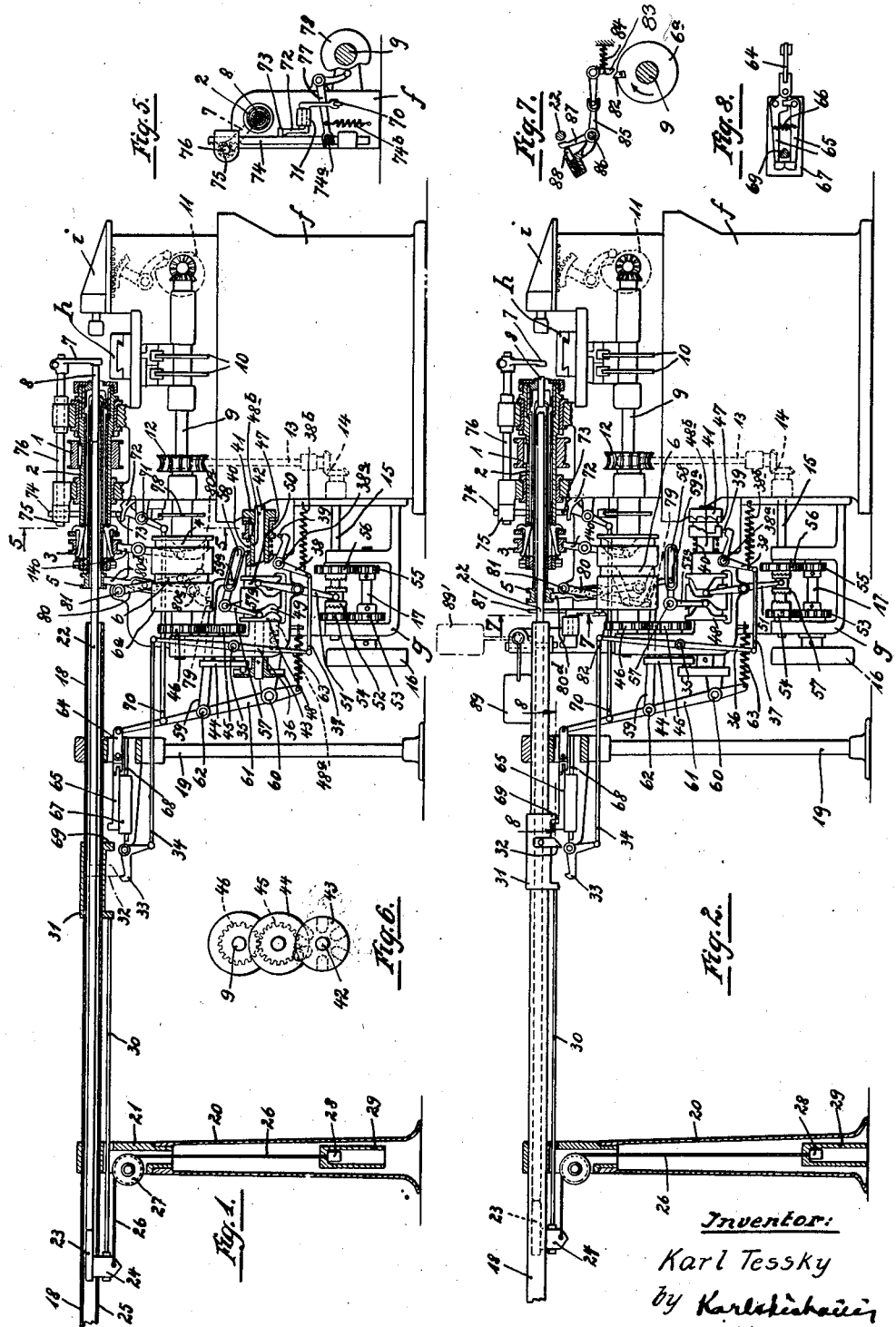
Inventor:
Karl Tessky
by Karl Lichhauer
Atty.

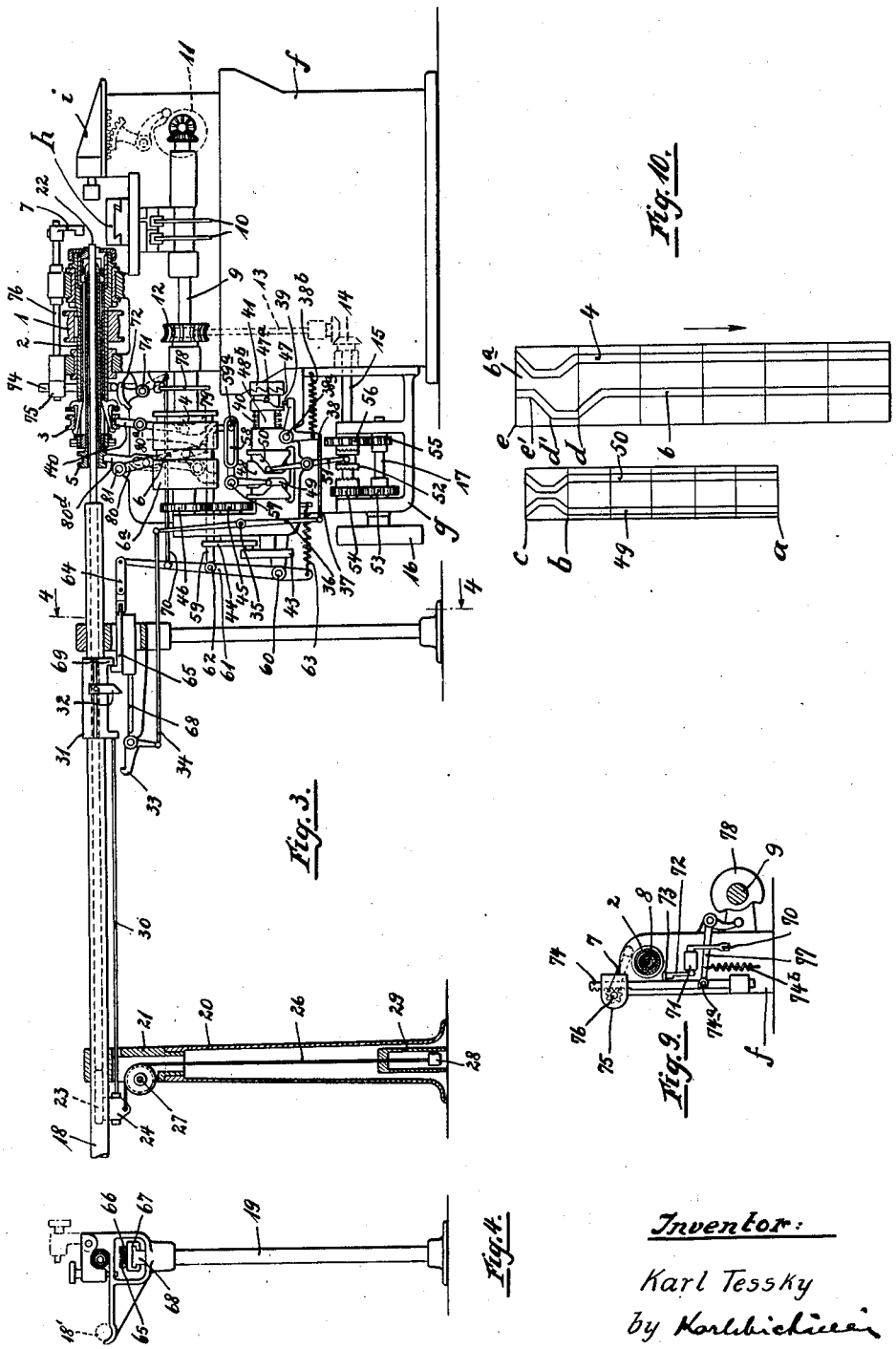

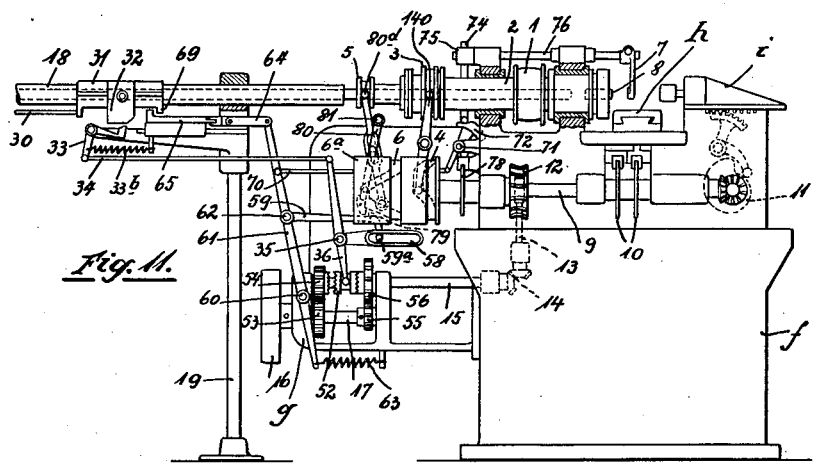

May 23, 1933.  K. TESSKY  1,910,574
MACHINE TOOL
Filed May 9, 1931  4 Sheets-Sheet 4
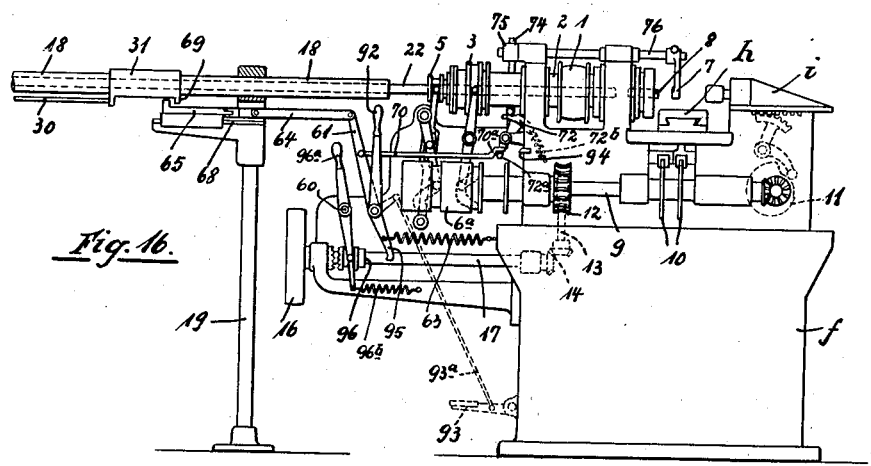
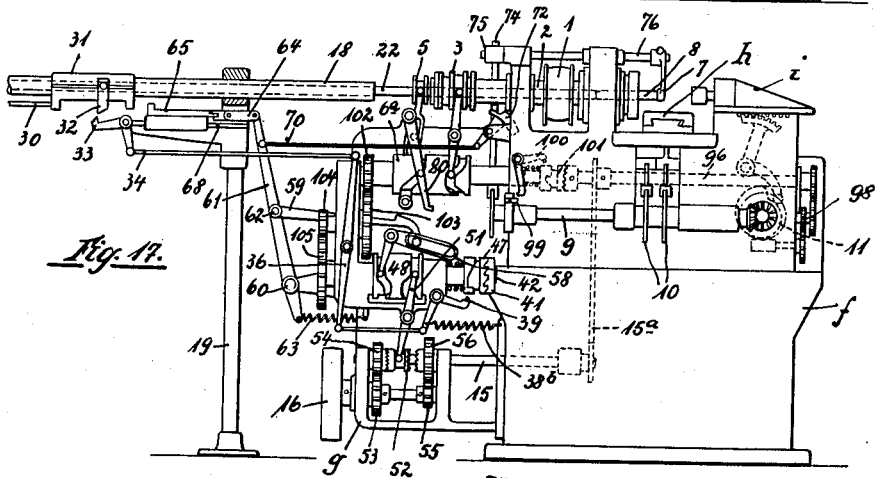
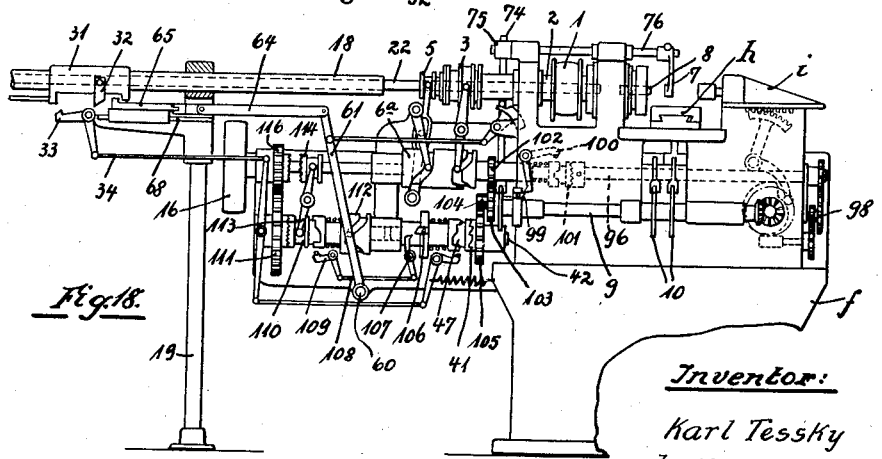
Inventor:
Karl Tessky
by Karl Michaelis
Atty.

Patented May 23, 1933

1,910,574

UNITED STATES PATENT OFFICE

KARL TESSKY, OF ESSLINGEN-ON-THE-NECKAR, GERMANY

MACHINE TOOL

Application filed May 9, 1931, Serial No. 536,235, and in Germany May 20, 1930.

My invention relates to machine tools and more particularly to lathes for tooling bar stock.

It is an object of my invention to improve a machine of this type with a view to increasing its economy and efficiency by practically eliminating all idle-running periods so that the machine operates continuously with the exception of the stops necessitated by regrinding, resetting and other maintenance operations.

To this end, in combination with the usual means for feeding and chucking the bars, which will not be described as they do not form part of the present invention, I provide means for supplying a fresh bar to the machine when the bar which is being tooled has become exhausted, these means holding the fresh bar in contact with the bar being tooled in any suitable manner and under steady pressure, preferably by gravity means, as will be described later on. However springs, pneumatic or hydraulic mechanisms may also be provided. The fresh bar is moved toward the tools of the machine along with the bar being tooled. I further provide a gripper which will be referred to as the ejector.

When the bar being tooled has become so short that its remaining portion, which will be referred to as the waste end, cannot be fed through a complete cycle of tooling operations, the ejector is caused to engage the fresh bar and to move it through a stroke which is larger than the feed stroke, ejecting the waste end of the preceding bar and advancing the fresh bar until its free end is in position for the first tooling operation, normally trimming-off.

Other objects of my invention will appear from the following specification.

In automatic lathes or the like which handle bar stock and successively sever the finished articles from the bar, the bars are utilized with the exception of a short piece which is the waste end already referred to. The bar is usually fed by means of a chuck which engages the bar under strong spring pressure. The chuck is operated from a control shaft and at a given time feeds the bar toward a check which exactly limits the feed stroke. When the bar has been tooled down to the waste end which, as mentioned, is so short that the chuck cannot feed it through the distance corresponding to the full length of an article, the machine must be arrested by automatic means. This is necessary not only for preventing scrap but first and foremost for preventing damage to the tools. Such damage may occur, for instance, if the centering tool cannot perform its function properly on account of insufficient feed and at the next operation, for instance, boring, the boring tool engages the uncentered bar in any irregular position, starting the boring operation eccentrically and getting broken in consequence.

After the machine has been arrested automatically, several operations are required before it can be started for another cycle on a fresh bar. The chuck is opened, usually by rotating a hand wheel on the control shaft, the bar check is moved aside by hand, being raised or rocked, and the waste end is extracted or ejected by the fresh bar which is advanced from the rear end of the spindle. The next operation is pushing forward the fresh bar until its free end projects slightly from the chuck so that the trimming-off tool is just able to begin its operation on the projecting end. The pushing of the fresh bar through the chuck requires considerable power on account of the strong clamping resistance of the chuck.

Only after these operations have been performed the machine may be restarted for its normal operation. During the following revolution of the control shaft the bar is fed as far as the bar check and the cutting tools now perform their operations in the normal manner. The articles are finished from the fresh bar in rapid succession until the bar has become exhausted and another bar is introduced in the manner described.

It will be understood that the introducing of fresh bars requires considerable handling and a corresponding loss of time per fresh bar. The loss of time is much increased on account of the fact that a single operator usually attends five to eight machines and will not always be ready for inserting a fresh bar immediately when one of the machines has completed its operations on the preceding bar. For instance, he may be busy with resetting or regrinding of the tools or some other maintenance operation, at another machine of his group, or he may be introducing a fresh bar in one of the machines just when one or more of the other machines have finished their bars. It follows that in addition to the inevitable idle running of the machines during the exchanging of the bars, another idle period which is due to the human factor will occur almost at every bar exchange from the moment the machine is automatically arrested to the moment a fresh bar is introduced, since, for the reasons stated, the operator is not able to supply a fresh bar to each of these machines immediately it is required. Calculated per day and per machine, the total loss of output due to this frequent waste of time is a very important factor.

According to the present invention the lost periods which so much reduce the overall output of the machines, are limited to the practical minimum. The machine operates practically continuously, apart from the regrinding of the tools and other maintenance operations, and trouble resulting from insufficient feed of the waste ends is reliably eliminated.

It has already been suggested to shorten the idle periods by equipping the machine with a magazine for the bars and with means which when a bar has been tooled down to a certain length, arrest the machine under the control of a feeler slipping off the bar and operating a brake, take a fresh bar from the magazine and present it to the machine. However, in this system the idle running and loss of output during the automatic taking of the bar from the magazine, introducing it into the machine, and pushing it through the chuck, are not eliminated, and the only advantage of machines of this kind as designed heretofore is a certain, but insignificant, saving of time by effecting the several operations automatically and in rapid succession.

A considerable reduction of the loss of output down to a minimum, which is the practical limit, can only be effected according to the present invention by providing an arrangement of the kind referred to which permits introducing a fresh bar during the normal operation of the machine, without requiring the magazine referred to, and causing the fresh bar to follow the bar being tooled under the action of a steady force, for instance, the pressure of a weight, until the fresh bar is in the immediate vicinity of the chuck, whereupon it is pushed into the feeding and chucking means while at the same time the bar check is moved out of the way for a short period and the fresh bar ejects the waste end of the preceding bar. The machine runs idle only during the very short periods for ejecting the waste ends, and need not be arrested.

The operator is now in a position to select the most convenient moment within a large margin of time for introducing a fresh bar in a given machine. After he has introduced the bar the exchanging of the bars no longer engages his attention as it is performed automatically in good time, and with a minimum loss of output.

In the drawings affixed to this specification and forming part thereof various types of lathes embodying my invention are illustrated diagrammatically by way of example.

In the drawings

Figs. 1–10 illustrate a machine in which the mechanism for operating the ejector is actuated from the control shaft of the machine through an intermediate mechanism.

Fig. 1 is a partly sectional elevation of the machine showing it at the moment when the ejector is ready for action, Fig. 2 is the machine at the moment when the ejector engages the means for supplying a fresh bar, and Fig. 3 is it after the ejector has performed its operation and advanced the fresh bar into position for the first tooling operation, Fig. 4 is a section on the line 4—4 in Fig. 3, Fig. 5 is a section on the line 5—5 in Fig. 1, Fig. 6 is a detail of the intermediate gear, viewed from the left in Fig. 1, Figs. 7 and 8 are sections on the lines 7—7 and 8—8 in Fig. 2, Fig. 9 is a section similar to Fig. 5 but showing the parts in a different position, and Fig. 10 shows four camways of the machine, straightened out.

Fig. 11 is a part elevation of a modified machine in which the intermediate mechanism is dispensed with altogether, Fig. 12 is a part elevation of a machine in which the intermediate mechanism is arranged on the control shaft, Fig. 13 shows the machine in Fig. 12 in combination with means for controlling the ejector through the bar-feeding means, Fig. 14 is a section on the line 14—14 in Fig. 13, Fig. 15 shows a portion of a camway of the machine in Fig. 13, straightened out, Fig. 16 is a part elevation of a machine in which the ejector is under manual control, Fig. 17 is an elevation of a machine which is similar to that in Figs. 1–10, but equipped with a modified intermediate mechanism, and Fig. 18 shows a further modification of the intermediate mechanism illustrated in Fig. 17.

Referring now to the drawings, and first to Figs. 1–10, $f$ is the frame of the machine, 1 is a pulley, and 2 is the hollow spindle of the machine on which the pulley 1 is keyed. 3 and 5 are annular members for tensioning the chuck and for feeding the bar. The annular members 3 and 5, and the chuck itself, will not be described as they form no part of the present invention. 9 is the control shaft of the machine, 16 is a pulley on the shaft 17 of a change-speed gear $g$, 15 is a lay shaft of the gear, 14 are a pair of bevel gears, one on the shaft 15 and the other on a vertical shaft 13, and 12 is a worm gear for rotating the control shaft 9 from the vertical shaft 13.

$6a$ is a cam cylinder which, in manner known per se, is mounted on the control shaft 9, 4 and 6 are camways in the cylinder $6a$, and 140 and $80d$ are rocking levers extending from the camways 4 and 6 to the members 3 and 5, respectively. 7 is the bar check which is mounted to rock on a shaft 76 and is moved in time with the operation of the members 3 and 5 by mechanism which will presently be described. During the feeding of the bar the check 7 is periodically moved into engagement with the outer end of the bar 8, which is being tooled, and turned aside for presenting the end face of the bar to the tools. $h$ and $i$ are tool slides, 10 are cams on the control shaft 9 for operating the slide $h$, and 11 is a cam connected to the control shaft by bevel gears and cooperating with an arm and a sector, for operating the slide $i$.

18 is a tube for supplying the machine with fresh bars 22, 19 and 20 are uprights in which the tube 18 is secured in a manner known per se, and 21 is a hollow pivot at the top of the upright 20 through the medium of which the tube 18 is rocked about the axis of the upright, permitting the introduction of a fresh bar 22 into the tube 18 from the end facing the frame $f$, as indicated at 18′ in Fig. 4.

Fig. 1 shows the fresh bar 22 partly in the tube 18 and partly in the hollow spindle 2 of the machine where its front end abuts against the waste end of the bar 8 which is being tooled and is retained by the check 7 on the rocking shaft 76. 23 is a bar-advancing slide in the tube 18, with a lug 24 projecting downwardly through a slot 25 in the pipe 18. 26 is a cable or the like which is secured to the lug 25, 27 is a sheave in the hollow pivot 21 of the upright 20, 28 is a weight at the lower end of the cable 26, and 29 is a hollow weight which is freely supported on the weight 28. Instead of the gravity-controlled means illustrated, springs, pneumatic or hydraulic means (not shown) acting on pistons or the like, may be provided. In the position illustrated in Fig. 1 the two weights 28 and 29 act together on the cable 26, and exert pressure on the slide 23 by which the fresh bar 22 is held against, and advanced with, the bar 8 as it is fed during tooling.

31 is a sleeve which is mounted to slide on the tube 18 and connected to the lug 24 by a rod 30. 32 is a cam on the sleeve 31 which may be adjustable and has an inclined face, and 33 is a bell-crank-lever which is engaged by the cam 32 at the hook-shaped end of its horizontal arm.

Fig. 1 shows the cam 32 in the position in which it has just rotated the bell-crank lever 33 anti-clockwise. This is the first stage in the operation of the ejector 65, Fig. 8, and prepares the intermediate gear for action on the ejector, as will be described. 34 is a rod which is linked to the vertical arm of the bell-crank lever 33 at one end, and to a double-armed rocking lever 36 at the other end. The rocking lever 36 is fulcrumed on a bracket on the frame $f$ at 35. 37 is a rod which is pivoted to the lower end of the rocking lever 36, 38, 39 is a bell-crank lever which is fulcrumed on the bracket at $38a$, and $38b$ is a spring which is attached to the arm 38 at one end, and to a flange on the frame of the change-speed gear $g$ at the other end. 42 is the shaft of the intermediate gear which is mounted to rotate in the bracket, and 41, 47 are the two members of a clutch on the shaft 42. The clutch member 41 is fixed on the shaft 42 while the clutch member 47 is mounted to slide on the shaft 42 and to engage the fixed member 41 under the action of a spring 40. Rotation is imparted to the shaft 42 from the control shaft 9 through the medium of a Geneva stop 43 on the rear end of the shaft 42. 44 is a single-pin wheel on a lay shaft which is mounted to rotate in the bracket of the intermediate gear, 45 is a spur gear on the lay shaft, and 46 is a spur gear on the control shaft 9 which meshes with the spur gear 45. By these means the shaft 42 of the intermediate gear is rotated intermittently from the shaft 19. In the present instance the Geneva stop 43 has six grooves, as shown in Fig. 6.

The movable member 47 of the clutch on the shaft 42 is splined on the tubular boss $48b$ of a cam cylinder 48. $47a$ is a cam face in a groove of the clutch member 47, which is adapted to be engaged by a projection at the end of the arm 39 of the bell-crank lever 38, 39. Devices of this kind are old in the art. In the present instance, after a full revolution of the shaft 42 the projection forces back the member 47 against the action of the spring 40 by the cam face $47a$, throwing out the clutch.

$48a$ is a spring catch which is shown in dotted lines in Fig. 1 and engages the end face of the cam cylinder 48 opposite the member 47 so as to normally hold the cam cylinder against rotation. 49 and 50 are cam grooves in the cam cylinder. 51 is a double-armed lever which is fulcrumed on the bracket of the intermediate gear, one of its ends engaging in the groove 50, and the other end engaging a clutch member 52 on the lay shaft 15 of the change-speed gear $g$. 53 and 55 are spur gears on the pulley shaft 17, and 54 and 56 are spur gears on the lay shaft 15 which mesh with the gears 53 and 55. The gears 54 and 56 are free to rotate on the lay shaft 15, and are alternately connected to it by the clutch member 52. The ratio of the change-speed gear $g$ is so determined that when the spur gear 54 is thrown in as shown in Fig. 1 the control shaft 9 is rotated at a higher speed than when the spur gear 56 is thrown in.

57 is one arm of a bell-crank lever which is fulcrumed on the bracket of the intermediate gear at 57$a$, with its free end engaging in the groove 49 of the cam cylinder 48. The other arm 58 of the bell-crank lever is slotted for the reception of a pin 59$a$ at one end of a link 59 the other end of which is pivoted at 62 to a double-armed lever 61. This lever is fulcrumed on the bracket of the intermediate gear at 60, and 63 is a spring which engages its shorter arm below the pin 60. The longer arm to which the link 59 is pivoted at 62, engages a link 64 with its upper end which is pivoted to the ejector 65.

The ejector, as shown in Fig. 8, resembles a pair of tongs the arms of which are held engaged at their free ends by a spring 66. 67 is a block with which the ejector 65 slides on a track 68. 69 is a lug at the free end of the sleeve 31 which is adapted to enter between the beveled free ends of the ejector arms by forcing them apart when the sleeve 31 moves from the left to the right into the position illustrated in Fig. 2, and entering between them. The sleeve 31 is now ready to be entrained by the ejector 65 when the ejector moves to the right as shown in Fig. 3.

Operatively connected to the double-armed lever 61 is a control for the bar check 7. 70 is a rod which is pivoted to the lever 61 at one end and to a cam lever 72 which is fulcrumed in the frame $f$ at 71, at its other end. 74 is a rack which is mounted to slide in suitable blocks on the frame $f$, or on a bracket (not shown) on the frame, and 73 is a pin on the rack which bears on the cam lever 72, as best seen in Figs. 5 and 9. 75 is a pinion on the shaft 76 of the bar check 7 which meshes with the rack. In Fig. 5 the check 7 is shown in the position in which it engages the front end of the bar 8, as also shown in Fig. 1. When the ejector 64 is moved to the right as shown in Fig. 3 the cam lever 72 is rotated anti-clockwise, its elevated portion raises the pin 73 and also the rack 74, and the shaft 76 is rotated to move the check 7 out of the way of the bar 8, as shown in Figs. 2 and 9 so that the waste rear end of the bar is free to be ejected from the hollow shaft 2 by the fresh bar 22 which is advanced by the ejector 65, as will be described. The pin 73 and the cam lever 72 cooperate only when a bar is ejected. Normally the pin 73 is free of the lever and the check 7 is controlled by a cam plate 78 on the control shaft 9, a bell-crank lever 77 which is rocked by the cam plate 78, a pin 74$a$ which is engaged by a fork on the longer arm of the bell-crank lever, and a pull-back spring 74$b$ for holding its shorter arm engaged with the cam plate 78.

When the cam 32 at the sleeve 31 strikes the bell-crank lever 33, Fig. 1, the bell-crank lever 38, 39 is rocked by the mechanism described, and the projection on its arm 39 releases the clutch member 47 on the shaft 42, permitting the spring 40 to throw in the clutch and causing the cam cylinder 48 to be rotated intermittently by the Geneva stop 43. The camways 49 and 50, Fig. 10, in the cam cylinder 48 are parallel for a distance $a$—$b$ corresponding to five steps in the rotation of the shaft 42 under the action of the Geneva stop 43, and crooked for the distance $b$—$c$ which corresponds to the sixth step. The rotation of the shaft 42 is so timed with respect to that of the control shaft 9 that the cam cylinder 6$a$ rotates from $d$ to $e$ while the cam cylinder 48 rotates from $b$ to $c$. The crooked portions of the camways 4, 6 and 50, 49 act on the respective levers when the bar 8 has been tooled down so far that the end which remains in the machine cannot be fed through the distance corresponding to the full length of an article and must be ejected as a waste end. The lever 51 which is controlled by the camway 50 in the cam cylinder 48 on the shaft 42, now throws over the clutch member 52 on the lay shaft 15 so that it engages the spur gear 56, causing the control shaft 9 to rotate at its lower speed. The object of this is to delay the operations which follow the ejection of the waste end so as to avoid shocks which would occur if the control shaft 9 rotated on at its former and higher speed. If the output of the machine per unit of time is small and the speed of the control shaft is low in proportion, the change-speed gear $g$ may be dispensed with, and machines without a change-speed gear will be described.

The levers 140 and 80$d$ are operated at the same time by their camways 4 and 6 in the cam cylinder 6$a$ on the control shaft 9. The lever 140 engages directly the annular member 3 for putting tension on the chuck. The lever 80$d$ by which the feeding member 5 is operated, is not engaged directly by the cam 6 but is operated through an intermediate connection which is best seen in Figs. 2 and 14.

The bell-crank lever 57 when rocked, raises the link 59 by its slotted arm 58 and thereby moves its lug 79 into the reach of a corresponding lug 80$a$ on a lever 80 which is fulcrumed about a pin 81, and is controlled by the camway 6. The lever 80, through the medium of a pin 80$b$ which is adapted to be displaced, transmits its movement to a lever 80$d$ which is fulcrumed at 80$c$ and with its forked upper end engages the annular member 5. The illustration in Fig. 14 shows a modification which will be described in its turn and in which the lever 80 engages in the camway 49 of the cam cylinder 48, and not in the camway 6 of the cylinder 6a, with a pin 80e, the cam cylinder 48 being here arranged on the control shaft 9, but otherwise the operation of the connection is exactly the same. The lug 79 on the link 59 is entrained by the lug 80a of the lever 80 after having been moved into its way by the slotted arm 58.

When the sleeve 31 has advanced into the position Fig. 2 the weight 29 is seated on the base plate of the machine in the upright 20, Fig. 2, and only the weight 28 acts on the slide 23, for keeping taut the cable 26. The lug 79 on the link 59 has now engaged the free end 80a of the lever 80 and the lug 69 on the sleeve 31 has entered between the arms of the ejector 65, Fig. 8. The lever 80 is rocked anti-clockwise through the medium of the kink $d'$—$e'$, Fig. 10, of the camway 6, entraining the link 59 by its lug 79, and also entraining the ejector 65 by the lever 61 to which the link 59 is pivoted at 62. The lever 61, the ejector 65, the sleeve 31 which the ejector 65 engages by its lug 69, the slide 23, and the fresh bar 22 are now moved to the right by the lever 80 through a greater distance than the normal feed. At the same time the rod 70 which, as described, is also pivoted to the lever 61, rotates the cam lever 72 and, through the medium of the pin 73, the rack 74, and the pinion 75, moves the check 7 aside, so that the waste end of the bar 8 is ejected and the fresh bar 22 moved into the position Fig. 3, with its free end projecting from the spindle 2 in position for trimming off. Upon further rotation of the cam cylinder 48 the slotted arm 58 of the bell-crank lever 57, 58 is lowered by the camway 49, moving the lug 79 on the link 59 out of reach of the lug 80a on the lever 80 and permitting the spring 63 to return the lever 61 with the ejector 65 into the position Fig. 1. At the same time the lever 51 is moved by its camway 50 to reverse the clutch member 52 for the higher speed of the control shaft 9, and the cam lever 72 is rotated clockwise by the rod 70 so that the pin 73 slides down from its elevated portion. The cam plate 78 is now free to control the check 7 as required for the tooling operations on the fresh bar without interference by the pin 73.

The first cycle of normal tooling operations is now started on the fresh bar 22 the end of which, as mentioned, projects from the chuck in the spindle 2 for such a distance that it can be trimmed off by a suitable tool, not shown, the check 7 having been rocked out of the way by means of the cam plate 78. At the following revolution of the control-shaft 9 the check 7 is returned into active position, the bar is advanced as far as the check, Fig. 1, and tooled until its rear end has left the tube 18.

The operator now rocks aside the tube 18 as shown in Fig. 4 and inserts a fresh bar 22, pushing back the slide 31 and raising the weights 28 and 29. By rocking the tube 18 the lug 69 is moved beyond reach of the ejector 65 and the return movement of the tube 18 for realigning it with the axis of the spindle 2 is not interfered with by the ejector 65. The lug 32 at the sleeve 31 is so positioned or adjusted that the bell-crank lever 32 is operated and in turn operates the intermediate mechanism only after the last article of normal length has been tooled on the bar 8. When the lug 32 strikes the bell-crank lever 33 the clutch member 52 is thrown over for reducing the speed of the control shaft 9, and the ejector 65 rapidly advances the fresh bar 22 so far that the waste end of the bar 8 is ejected and the fresh bar 22 is moved into trimming-off position through the chuck.

Preferably means, visible from afar, are provided for indicating when the bar 8 which is being tooled has left the tube 18 and the machine is ready for the insertion of a fresh bar 22. A signalling device for this purpose is illustrated in Figs. 2 and 7. 82 is a pawl on the cam cylinder 6a on the shaft 9, 83 is a bell-crank lever connected to a pull-back spring 84 and adapted to cooperate with the pawl 82, 85, 87 is another bell-crank lever which is fulcrumed at 86 and connected to the bell-crank lever 83, and 88 is a spring buffer which holds the arm 87 against the bar 8. The arm 87 is positioned near the rear end of the tube 18. At each revolution of the cam cylinder 6a the pawl 82 yieldingly applies the arm 87 against the bar 8 and when the bar has moved past the arm 87 the arm is permitted to rock through a larger angle, thereby moving a signaling arm 89 from the position shown in full lines in Fig. 2 into the position shown in dotted lines in which it is very noticeable and indicates that the machine is ready for a fresh bar.

The mechanism by which the signal 89 is moved from the arm 87 may be designed in any suitable manner, and has not been shown.

The intermediate gear on the shaft 42 is preferably provided if comparatively short articles are tooled in the machine for tooling down the bar until it is so short that it cannot be fed through the full length of an article. If the articles are comparatively long the intermediate gear on the shaft 42 may be dispensed with. A machine of this simplified type is illustrated in Fig. 11, parts of which are identical with those described being indicated by the same reference numerals or letters in Fig. 11 and in all following figures, and the parts at the left of the machine being omitted. In this machine the bell-crank lever 33 is arranged with its horizontal arm extending to the rear and a pullback spring 33b is attached to its vertical arm. The slotted arm 58 of the bell-crank lever 57, 58 described with reference to Figs. 1-10 is here combined with the lever 36 the short arm of which acts on the clutch member 52 of the change-speed gear g instead of the lever 51 which is controlled by the intermediate gear in the machine Figs. 1-10. The spring 38b at the bell-crank arm 38 which tends to return the lever 36 into its initial position, is here replaced by the spring 33b which tends to return the lever 33 to its initial position after it has been released by the cam 32. The link 59 is equipped with the lug 79 for cooperation with the lug 80a on the lever 80 as described, and is raised into active position with respect to the lever through the medium of rod 34, lever 36 and slotted arm 58, under the control of the bell-crank lever 33. The lower arm of the lever 36 moves the clutching member 52 alternately into engagement with the gear 54 and the gear 56 on the shaft 15 and in the position illustrated in Fig. 11 has just set the change-speed gear for the slower speed of the control shaft 9. This simplified machine, as mentioned, is particularly suitable for a machine handling long articles.

Referring now to Fig. 12, the change-speed gear g is dispensed with, and the intermediate gear, with its cam cylinder 48, the clutch members 41 and 47, the lever 38, 39 and its pull-back spring 38a, is arranged on the control shaft 9 in line with the cam cylinder 6a. Instead of the lever 61, a one-armed lever 64a is connected to the link 64 of the ejector 65 and fulcrumed at 64b. This lever is controlled by a camway in a cam cylinder 90 on the control shaft 9. In order to effect the bar-advancing operation of the ejector 65 simultaneously with the normal feed, that is, during the time the cutting tools are not in operation, the clutch member 41 has a single tooth only while the member 47 has six recesses and the camway 90 has six rises and falls. The clutch 41, 47 is therefore thrown in for 60 degrees while the ejector 65 advances, and then thrown out again. The control of the clutch through the medium of the bell-crank lever 33, rod 34, double-armed lever 36, rod 37, and pull-back spring 38b, is the same as described with reference to Figs. 1-10. As the change-speed gear g is dispensed with the slowing down of the control shaft 9 during the advancing of the fresh bar does not occur in this machine, the shaft 9 being rotated at constant speed from the pulley 16 through the medium of bevel gears 14, shaft 13 and worm gear 12.

Referring now to Figs. 13 to 15, these illustrate the adaptation of an old device, to wit, means controlled by the chuck releasing the waste end of the bar, for operating the mechanism for advancing the fresh bar, for instance, operating the ejector 65, slowing down the control shaft 9, etc. These operations which might be started by any other suitable means for the same purpose, are here effected under the control of the member 5 which becomes active when the chuck releases the waste end of the bar. The lug 79 with which the lug 80a on the lever 80 cooperates, is here attached to the lever 51 for controlling the change-speed gear g, and is designed as a catch, with a spring 79a. A spring 51a tends to pull the lever 51 to the left and to throw in the clutch for the higher speed of the control shaft 19. The lever 51 is combined with the arm 39 for controlling the clutch 41, 47, with the cam cylinder 90. The groove 49 in which the pin, roller or the like 80e of the lever 80 engages, Fig. 14, has a bay 91 into which the pin or the like 80e is moved by a torsion spring 81a on the shaft 81 of the lever 80 when the sleeve 5 is released by the chuck coming off the waste end of the bar 8. When the pin 80e enters the bays 91 the lug 80a of the lever 80 engages behind the catch 79 and when the lever 80 is thereupon rocked in anti-clockwise direction the lever 51 is thrown over to the right, causing the clutch member 52 to slow down the control shaft 9 and permitting the clutch 47, 41 to be thrown in, so that the cam cylinder 90 is rotated and the ejector 65 is operated, as described with reference to Fig. 12.

Referring now to Fig. 16, this is a particularly simple manually controlled machine which when a bar has become exhausted, is arrested by any suitable means whereupon the fresh bar 22 is advanced through the medium of a handle 92 on the pivot 60 of lever 61. Instead of the handle 92 a pedal 93 with a connecting rod 93a might be provided for operating the lever 61. The lever 61 is connected to the ejector 65 through the medium of the link 64 and at the same time, through the medium of the rod 70 and the cam lever 72, the bar check 7 is moved aside. In this instance, however, the rod 70 is not pivoted to the cam lever 72 but is freely placed on a pin 72a at the lower end of the lever with its kinked end 70a. A spring 72b tends to hold the pin 72a engaged with the kink 70a. When the lever 72 has finished its rotation in anticlockwise direction the free end of the rod 70 strikes the inclined face of a dog 94 in the frame f, the kink 70a is raised out of engagement at the pin 72a and the spring 72b is free to return the lever 72 to its initial position in clockwise direction.

No change-speed gear is shown in this machine but a clutch 96 under the control of a handle 96a and a pull-back spring 96b is arranged on the shaft 17 for controlling its connection with the pulley 16. The bevel gear for rotating the vertical shaft 13 is here secured on the shaft 17 and not on the lay shaft 15. 95 is an extension at the lower end of the handle 92. The clutch 96 is thrown out by the lever 96a when the ejector 65 is operated, and automatically thrown in by the extension 95 when the operation of the ejector has been completed.

Fig. 17 shows the present invention as adapted to an automatic lathe having an auxiliary control shaft 96 which is operated from the pulley 16 through the medium of the lay shaft 15 in the change-speed gear and a sprocket chain 15a. Rotation is imparted to the control shaft 9 through the medium of suitable gearing generally indicated at 98. The cam cylinder 6a is mounted on a hollow shaft which is free to rotate on the auxiliary shaft 96 and is connected to the shaft by a clutch 101 operated by a cam 99 on the control shaft 9, and a clutching lever 100. The intermediate gear on the shaft 42 is provided in this machine but is not operated from the control shaft 9 but from the hollow shaft of the cam cylinder 6a through the medium of spur gears 102, 103, 104, 105 at a given rate which in the present instance is 1 by 6 corresponding to the six notches of the Geneva stop 43, Fig. 6. Otherwise the machine is designed as described with reference to Figs. 1–10, and the link 59 cooperates with the lever 80 in the manner described for operating the ejector 65.

Referring now to Fig. 18, this machine is again equipped with the intermediate mechanism on the shaft 42 to which rotation is imparted from the hollow shaft of the cam cylinder 6a by gearing 102, 103, 104, 105 similar to the gearing illustrated in Fig. 17 but differing therefrom as to its arrangement, the gear 102 being connected to the clutch member 41. When the clutch member 47 is thrown in a cam 106 which rotates with the clutch member after it has been thrown in, rotates anti-clockwise a double-armed lever 107 which is connected to a bell-crank lever 109 by a rod 108. This lever controls a second clutch 110 which is connected to a cam cylinder 112 in line with the shaft 42. When the lever 109 is operated by the lever 107 the clutch 110 is thrown in. 111 is a spur gear which is connected to the cam cylinder 112 when the clutch 110 is thrown in, and 116 is a spur gear on the shaft of the pulley 16 which meshes the spur gear 111. When the clutch 110 connects the spur gear 111 to the cam cylinder 112 the clutch and the cam cylinder perform one revolution. The lever 61 which is connected to the ejector 65 by the link 64, is operated by the cam cylinder 112, and the bar 22 is advanced as described. 114 is a clutch member by which the pulley 116 is connected to the auxiliary control shaft 96. This member is connected to the clutch 110 by a double-armed lever 113 so that when the clutch 110 is thrown in the clutch 114 is thrown out, arresting the auxiliary control shaft 96 and also the main control shaft 9 which is operated from the auxiliary control shaft by the gearing 98. When the clutch 110 has performed a complete revolution it is thrown out and at the same time the clutch 114 and the auxiliary shaft 96 with the main control shaft 9, are restarted.

Obviously in the machines illustrated in Figs. 17 and 18 the intermediate gear on the shaft 42 may be dispensed with for simplifying them as shown in Figs. 11 and 12; for instance, if comparatively long articles are handled. As mentioned, the intermediate gear which may be modified as desired, is preferably provided for short articles.

The clutch 110 in the machine illustrated in Fig. 18 and having the auxiliary control shaft 96, which clutch in cooperation with the permanent-mesh gear 111, 116 temporarily entrains the cam cylinder 112, may be operated in a machine having only a single control shaft, such as the main control shaft 9, from this control shaft and through the medium of an intermediate gear, if required. In this case the cam cylinder 6a is seated on the control shaft 9 and the cam cylinder 112 which is temporarily connected to the constant-mesh gear 111, 116 performs only a partial revolution, for instance through 60 degrees, similarly to Figs. 12 and 13, the control shaft 9 being thrown out at the beginning of the partial revolution, and thrown in after such partial revolution has been completed.

I wish it to be understood that I do not desire to be limited to the exact details of construction shown and described, for obvious modifications will occur to a person skilled in the art.

In particular, parts which are illustrated in one of the machines shown by way of example, may be adapted to one, or some, of the other machines. For instance, the change-speed gear 9 for slowing down the main control shaft 9 might be provided in machines where it has not been shown, such as the machines in Figs. 12, 16 and 18.

Auxiliaries which may be old in the art, or other suitable auxiliaries, may be provided in connection with the improvements forming part of the present invention.

In the claims affixed to this specification no selection of any particular modification of the invention is intended to the exclusion of other modifications thereof and the right to subsequently make claim to any modification not covered by these claims is expressly reserved.

I claim:—

1. A machine tool comprising means for feeding a bar through the machine while tooling it, means for supplying a fresh bar to the machine in contact with the bar being tooled, an ejector adapted to engage the fresh bar, means for moving said ejector through a stroke which is larger than the feed, a check for retaining the bar being tooled, and means operatively connected to said ejector-moving means for moving aside said check when said ejector performs its active stroke, and for returning it into its active position upon the return stroke of said ejector.

2. A machine tool comprising means for feeding a bar through the machine while tooling it, means for feeding a fresh bar to the machine in contact with the bar being tooled, an ejector adapted to engage the fresh bar, means for moving said ejector through a stroke which is larger than the normal feed, and means for preparing said ejector-moving means for operation when said bar-feeding means has moved through a given distance.

3. A machine tool comprising means for feeding a bar through the machine while tooling it, means for feeding a fresh bar to the machine in contact with the bar being tooled, an ejector adapted to engage the fresh bar, means for moving said ejector through a stroke which is larger than the normal feed, and adjustable means for preparing said ejector-moving means for operation when said bar-supplying means has moved through a given distance.

4. A machine tool comprising means for feeding a bar through the machine while tooling it, means for supplying a fresh bar to the machine in contact with the bar being tooled, an ejector adapted to engage the fresh bar, and means operatively connected to said feeding means for moving said ejector through a stroke which is larger than the feed.

5. A machine tool comprising means for feeding a bar through the machine while tooling it, means for supplying a fresh bar to the machine in contact with the bar being tooled, an ejector adapted to engage the fresh bar, means operatively connected to said feeding means for moving said ejector through a stroke which is larger than the feed, an intermediate mechanism, and means operatively connected to said mechanism for presenting said ejector-moving means to said feeding means at a given time.

6. A machine tool comprising means for feeding a bar through the machine while tooling it, a control shaft, means for rotating said control shaft, means on said control shaft for operating said feeding means, an intermediate gear adapted to be operated from said control shaft at a given rate, means for supplying a fresh bar to the machine in contact with the bar being tooled, an ejector adapted to engage the fresh bar, and means operatively connected to said intermediate gear for moving said ejector through a stroke which is larger than the feed.

7. A machine tool comprising means for feeding a bar through the machine while tooling it, a control shaft, means for rotating said control shaft, means on said control shaft for operating said feeding means, an intermediate gear, means for intermittently operating said intermediate gear from said control shaft, means for supplying a fresh bar to the machine in contact with the bar being tooled, an ejector adapted to engage the fresh bar, and means operatively connected to said intermediate gear for moving said ejector through a stroke which is larger than the feed.

8. A machine tool comprising means for feeding a bar through the machine while tooling it, a control shaft, means for rotating said control shaft, means for supplying a fresh bar to the machine in contact with the bar being tooled, an ejector adapted to engage the fresh bar, means for moving said ejector through a stroke which is larger than the feed, and means for slowing down said control shaft while said ejector performs its stroke.

9. A machine tool comprising means for feeding a bar through the machine while tooling it, a control shaft, means for rotating said control shaft, means for supplying a fresh bar to the machine in contact with the bar being tooled, an ejector adapted to engage the fresh bar, means for moving said ejector through a stroke which is larger than the feed, and means including a change-speed gear for slowing down said control shaft while said ejector performs its stroke.

10. A machine tool comprising means for feeding a bar through the machine while tooling it, a control shaft, means for rotating said control shaft, means on said control shaft for operating said feeding means, an intermediate gear adapted to be operated from said control shaft at a given rate, means for supplying a fresh bar to the machine in contact with the bar being tooled, an ejector adapted to engage the fresh bar, means operatively connected to said intermediate gear for moving said ejector through a stroke which is larger than the feed, and means also operatively connected to said intermediate gear for slowing down said control shaft while said ejector performs its stroke.

11. A machine tool comprising means for feeding a bar through the machine while tooling it, a control shaft, means for rotating said control shaft, means on said control shaft for operating said feeding means, an intermediate gear adapted to be operated from said means on said control shaft at a given rate, means for supplying a fresh bar to the machine in contact with the bar being tooled, an ejector adapted to engage the fresh bar, means operatively connected to said intermediate gear for moving said ejector through a stroke which is larger than the feed, and automatic means for throwing out said control shaft-rotating means while said ejector performs its stroke and for throwing it in again after said ejector has performed its stroke.

12. A machine tool comprising means for feeding a bar through the machine while tooling it, a control shaft, means for rotating said control shaft, means on said control shaft for operating said feeding means, an intermediate gear adapted to be operated from said control shaft at a given rate, means for supplying a fresh bar to the machine in contact with the bar being tooled, an ejector adapted to engage the fresh bar, means operatively connected to said intermediate gear for moving said ejector through a stroke which is larger than the feed, and automatic means for throwing out said control shaft-rotating means while said ejector performs its stroke and for throwing it in again after said ejector has performed its stroke.

13. A machine tool comprising means for feeding a bar through the machine while tooling, it means for feeding a fresh bar to the machine in contact with the bar being tooled, an ejector adapted to engage the fresh bar, and means for moving said ejector through a stroke which is larger than the normal feed.

14. A machine tool comprising means for feeding a bar through the machine while tooling it, means for feeding a fresh bar to the machine in contact with the bar being tooled, said means being adapted to exert continuous thrust on the fresh bar independently of the operation of the machine, an ejector, and means for moving said ejector through a stroke which is longer than the normal feed.

In testimony whereof I affix my signature.

KARL TESSKY.